(12) United States Patent
Nakamura et al.

(10) Patent No.: US 12,254,575 B2
(45) Date of Patent: Mar. 18, 2025

(54) INFORMATION PROCESSING APPARATUS, INFORMATION PROCESSING METHOD, AND STORAGE MEDIUM FOR PRESENTING VIRTUAL OBJECT

(71) Applicant: CANON KABUSHIKI KAISHA, Tokyo (JP)

(72) Inventors: Naohito Nakamura, Kanagawa (JP); Takabumi Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 18/163,136

(22) Filed: Feb. 1, 2023

(65) Prior Publication Data
US 2023/0252729 A1 Aug. 10, 2023

(30) Foreign Application Priority Data
Feb. 4, 2022 (JP) .................................. 2022-016424

(51) Int. Cl.
  *G06T 19/00* (2011.01)
  *G06F 3/01* (2006.01)
(52) U.S. Cl.
  CPC ............ *G06T 19/003* (2013.01); *G06F 3/011* (2013.01); *G06T 19/006* (2013.01)

(58) Field of Classification Search
None
See application file for complete search history.

(56) References Cited

U.S. PATENT DOCUMENTS

| 2016/0266386 | A1* | 9/2016 | Scott | G06F 3/017 |
| 2019/0346989 | A1 | 11/2019 | Yamagiwa | |
| 2022/0139041 | A1* | 5/2022 | Li | G06F 16/9558 |
| | | | | 345/419 |
| 2023/0290285 | A1* | 9/2023 | Aga | H04N 13/194 |

FOREIGN PATENT DOCUMENTS

JP 2006079174 A 3/2006

* cited by examiner

*Primary Examiner* — Frank S Chen
(74) *Attorney, Agent, or Firm* — Canon U.S.A., Inc. IP Division

(57) ABSTRACT

An information processing apparatus includes an acquisition unit configured to acquire a position and orientation of a virtual viewpoint and a position and orientation of each of one or more virtual objects, a movement unit configured to move the virtual viewpoint, a control unit configured to control each of the one or more virtual objects to be interlocked or not to be interlocked with movement of the virtual viewpoint based on whether the virtual object satisfies a predetermined condition, and a generation unit configured to generate a virtual image including the controlled one or more virtual objects at a viewpoint as a result of moving the virtual viewpoint.

18 Claims, 5 Drawing Sheets

INFORMATION PROCESSING APPARATUS, INFORMATION PROCESSING METHOD, AND STORAGE MEDIUM FOR PRESENTING VIRTUAL OBJECT

BACKGROUND

Field of the Disclosure

The present disclosure relates to an information processing apparatus that presents a virtual object.

Description of the Related Art

In recent years, virtual reality (VR) and mixed reality (MR) systems each intended to seamlessly combine a real space and a virtual space have been actively developed.

In a case where an observer actually moves a position in order to move a position in a virtual space in a VR or MR system, it is necessary to move each piece of equipment and to secure a real space of the same size as the virtual space. For this reason, conventionally, a position movement instruction means for separately designating position movement is provided. For example, a direction is designated using a position orientation sensor and a button separately provided is pressed, so that an instruction to move a position in the designated direction is given, or an instruction to move a position is given using a device such as a joystick. Freely moving a position in a virtual three-dimensional space in this way and performing observation is called "walkthrough". In a case where a position is kept moving by using a walkthrough function, it can be difficult to understand where the current place is. To address such an issue, Japanese Patent Application Laid-Open No. 2006-79174 discusses that a system has an actual-size observation mode and a reduced-size observation mode.

Meanwhile, in the VR or MR system, a virtual object is assigned to a world coordinate system and the virtual object is displayed, and moreover, for example, a virtual object is assigned to a real object whose position and orientation can be measured and the virtual object is displayed. In a case where a user operates the real object, the display of the virtual object assigned to the real object (hereinafter referred to as the virtual object on the real object) follows the operation by the user, and thus the user can intuitively operate the real object in the VR or MR system.

SUMMARY

According to an aspect of the present disclosure, an information processing apparatus includes an acquisition unit configured to acquire a position and orientation of a virtual viewpoint and a position and orientation of each of one or more virtual objects, a movement unit configured to move the virtual viewpoint, a control unit configured to control each of the one or more virtual objects to be interlocked or not to be interlocked with movement of the virtual viewpoint based on whether the virtual object satisfies a predetermined condition, and a generation unit configured to generate a virtual image including the controlled one or more virtual objects at a viewpoint as a result of moving the virtual viewpoint.

Further features of the present disclosure will become apparent from the following description of exemplary embodiments with reference to the attached drawings.

DESCRIPTION OF THE EMBODIMENTS

In a case where a virtual object is assigned to a real object whose position and orientation can be measured when a walkthrough function is used in a virtual reality (VR) or mixed reality (MR) system, various movements of the virtual object are conceivable as movements desirable for a user. For example, in a case where the user wants to confirm a virtual object on a world coordinate system and a virtual object on a real object from a different viewpoint, it is desirable to maintain a relative position and orientation relationship between the virtual object on the world coordinate system and the virtual object on the real object, when a virtual viewpoint is moved using the walkthrough function. In other words, it is desirable that the virtual object move in a manner interlocking with the walkthrough function. For example, in a case where the user freely operates the real object while holding the real object, it is desirable that the virtual object on the real object be unaffected by movement of the virtual viewpoint when the virtual viewpoint is moved using the walkthrough function. In other words, it is desirable that the virtual object move not in a manner interlocking with the walkthrough function. Conventionally, however, movement of a virtual object cannot be controlled in a manner desirable for a user.

Exemplary embodiments of the present disclosure will be described with reference to the drawings.

Figure 1:
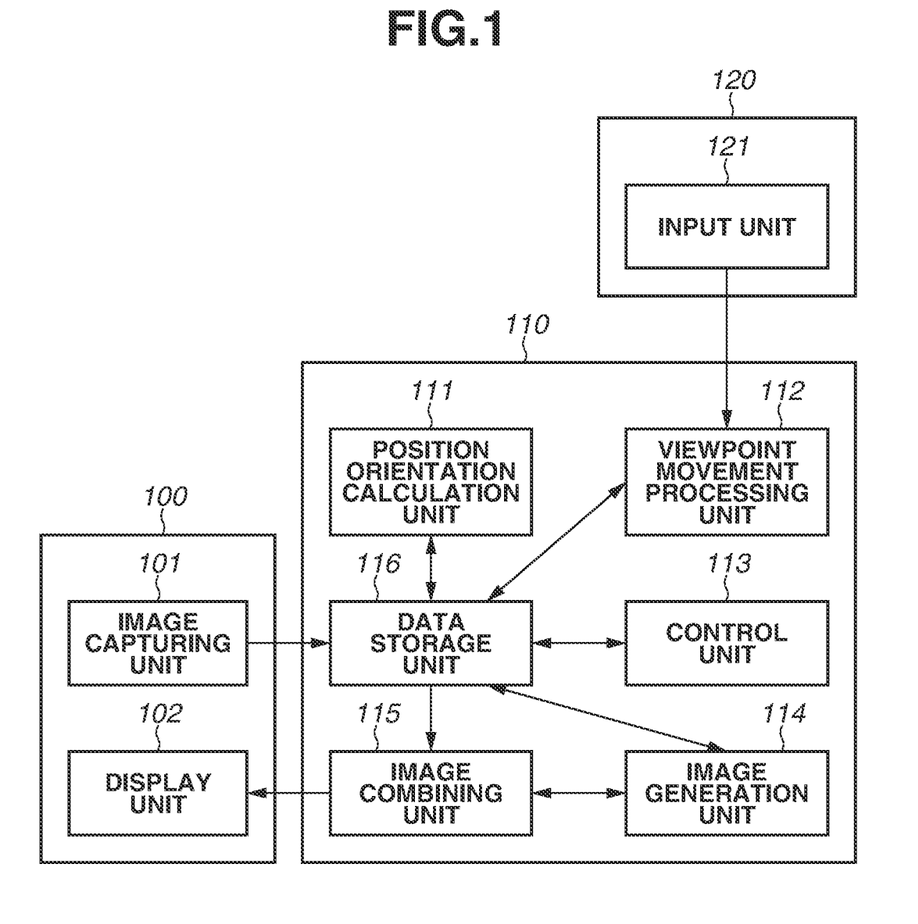
FIG. 1 is a diagram illustrating an example of a configuration of a system including an information processing apparatus according to one or more aspects of the present disclosure.

A first exemplary embodiment will be described. FIG. 1 illustrates an example of a configuration of a system including an information processing apparatus according to the present exemplary embodiment.

FIG. 1 is a diagram illustrating an example of a configuration of a system according to the present exemplary embodiment. The system according to the present exemplary embodiment is an image processing system for presenting an MR space in which a real space and a virtual space are combined, to a person who experiences a system (hereinafter referred to as "user"). In the present exemplary embodiment, there will be described a case where a combined image obtained by combining an image of a real space with an image of a virtual space drawn by computer graphics (CG) is displayed, so that the MR space is presented to the user.

The system according to the present exemplary embodiment includes a display apparatus 100, an information processing apparatus 110, and an input apparatus 120. The information processing apparatus 110 combines an image of a real space taken from the display apparatus 100 with an image of a virtual space generated in the information processing apparatus 110, and outputs the combined image to the display apparatus 100 as an MR image. The present disclosure relates to an information processing apparatus that displays an image of a virtual space, and is not limited to an MR system that displays an MR image obtained by combining an image of a real space with an image of a virtual space. In other words, the present disclosure is also applicable to a VR system that presents only an image of a virtual space to a user and an augmented reality (AR) system that displays an image of a virtual space through which a real space is visible to a user.

The display apparatus 100 includes an image capturing unit 101. The image capturing unit 101 sequentially captures images of a real space in time series, and outputs the captured images of the real space to the information processing apparatus 110. The image capturing unit 101 may include a stereo camera consisting of two cameras fixed to each other so that a real space can be imaged from a viewpoint position of a user.

The display apparatus 100 includes a display unit 102. The display unit 102 displays an MR image output from the information processing apparatus 110. The display unit 102 may include two displays arranged in correspondence with the left and right eyes of a user. In this case, an MR image for the left eye is displayed on the display corresponding to the left eye of the user, and an MR image for the right eye is displayed on the display corresponding to the right eye of the user.

The display apparatus 100 can be, for example, a head mounted display (HMD). The display apparatus 100 is not limited to the HMD, and may be a handheld display (HHD). The HHD is a display held by a hand. In other words, the display apparatus 100 may be a display for a user to observe an image by looking through the display while holding the display with a hand, as if using binoculars. Further, the display apparatus 100 may be a display terminal such as a tablet or a smartphone.

The input apparatus 120 includes an input unit 121. The input unit 121 is a controller that can input an instruction from the user to move a direction or position, and inputs an input value corresponding to a value that has been input, into the information processing apparatus 110. The input apparatus 120 is a joystick that is a control stick device and can acquire a value corresponding to the direction of a tilt of the stick. The input apparatus 120 is not limited to the joystick, and a device such as a keyboard or an input apparatus for video game can be used in place of the joystick.

The information processing apparatus 110 and the display apparatus 100 are connected to be able to perform data communication with each other, and the information processing apparatus 110 and the input apparatus 120 are similarly connected. The connection between the information processing apparatus 110 and the display apparatus 100 and the connection between the information processing apparatus 110 and the input apparatus 120 may each be wired or wireless. The information processing apparatus 110 may be arranged in a housing of the display apparatus 100.

The information processing apparatus 110 includes a position orientation calculation unit 111, a viewpoint movement processing unit 112, a control unit 113, an image generation unit 114, an image combining unit 115, and a data storage unit 116.

The position orientation calculation unit 111 calculates a position and orientation of the image capturing unit 101 in a world coordinate system, and a position and orientation of a real object for which a coordinate system (an individual coordinate system) different from the world coordinate system is set. Specifically, the position orientation calculation unit 111 extracts a marker assigned to the world coordinate system and a marker assigned to the individual coordinate system from an image of a real space captured by the image capturing unit 101. The marker assigned to the individual coordinate system is given to the real object that can be operated. The position orientation calculation unit 111 calculates the position and orientation of the image capturing unit 101 in the world coordinate system and the position and orientation of the real object in the individual coordinate system based on the positions and orientations of the markers. Information representing the calculated positions and orientations is stored into the data storage unit 116.

In the present exemplary embodiment, the position orientation calculation unit 111 acquires the position and orientation of a virtual viewpoint immediately before the virtual viewpoint is moved, by calculating the position and orientation of the image capturing unit 101. A position and orientation to be a reference on the world coordinate system may be acquired, in place of the position and orientation of the image capturing unit 101.

In the present exemplary embodiment, the virtual object is associated with the real object for which the individual coordinate system is set. The position orientation calculation unit 111 can acquire the position and orientation of the virtual object immediately before the virtual viewpoint is moved, by calculating the position and orientation of the real object in the individual coordinate system.

There are various methods as the method for calculating the position and orientation of the image capturing unit 101 and the position and orientation of the real object in the individual coordinate system, and the present exemplary embodiment is not limited to the above-described method. For example, the position and orientation of the image capturing unit 101 and the position and orientation of the real object in the individual coordinate system may be determined by performing simultaneous localization and mapping (SLAM) processing, based on a feature point appearing in an image. In addition, the position and orientation of the image capturing unit 101 may be determined by attaching a sensor whose position and orientation relative to the image capturing unit 101 is known to the HMD serving as the display apparatus 100, and converting a value measured by the sensor based on this relative position and orientation. Similarly, the position and orientation of the real object in the individual coordinate system may be determined by attaching a sensor whose position and orientation relative to the real object that can be operated is known to the real object. A motion capture system may also be used.

The viewpoint movement processing unit 112 calculates a movement amount of the virtual viewpoint based on an input value from the input unit 121, and performs processing for moving the position and orientation of the virtual viewpoint based on the calculated movement amount of the virtual viewpoint.

The virtual viewpoint refers to a viewpoint of an image of a virtual space generated by the image generation unit 114.

In the present exemplary embodiment, the position and orientation of the virtual viewpoint is calculated by adding the calculated movement amount of the virtual viewpoint to the position and orientation of the image capturing unit 101 calculated by the position orientation calculation unit 111. The viewpoint movement processing unit 112 calculates, as the movement amount of the virtual viewpoint, a movement amount of movement of the position of the virtual viewpoint in each of three axis directions orthogonal to each other, or a movement amount of rotation of the orientation of the virtual viewpoint in each of three axis directions orthogonal to each other, using the input value from the input unit 121. The result of calculating the position and orientation of the virtual viewpoint and the result of calculating the movement amount of the virtual viewpoint are stored into the data storage unit 116.

The control unit 113 performs, for each of the real objects for each of which the individual coordinate system is set, processing of determining whether to perform interlocking with the movement of the virtual viewpoint by the viewpoint movement processing unit 112. In a case where the interlocking is to be performed, the control unit 113 updates the position and orientation of the real object calculated by the position orientation calculation unit 111 based on the movement amount of the virtual viewpoint, and stores the updated position and orientation into the data storage unit 116, as the position and orientation of the virtual object. In a case where the interlocking is not to be performed, the control unit 113 directly stores the position and orientation of the real object calculated by the position orientation calculation unit 111 into the data storage unit 116, as the position and orientation of the virtual object.

The image generation unit 114 builds a virtual space based on data about the virtual space stored in the data storage unit 116. The data about the virtual space includes data related to each of virtual objects in the virtual space and data related to a light source for irradiating the entire virtual space. The image generation unit 114 sets the position and orientation of the virtual viewpoint calculated by the viewpoint movement processing unit 112 and stored in the data storage unit 116. The image generation unit 114 places the virtual object in the virtual space in correspondence with the position and orientation of the virtual object having the individual coordinate system and stored in the data storage unit 116. The image generation unit 114 generates an image (virtual image) of the virtual space seen from the viewpoint of the set position and orientation. The technique for generating a virtual image seen from a viewpoint of a predetermined position and orientation is a known technique, and thus detailed description of the technique will be omitted.

The image combining unit 115 combines the virtual image generated by the image generation unit 114 and the image of the real space captured by the image capturing unit 101, and generates an MR image. The generated MR image is output to the display apparatus 100.

As described above, the data storage unit 116 is intended to store various kinds of information, and includes a random access memory (RAM), a hard disk drive, or the like. The data storage unit 116 stores, in addition to the information described above to be stored in the data storage unit 116, information to be described as known information in the present exemplary embodiment.

Figure 2:
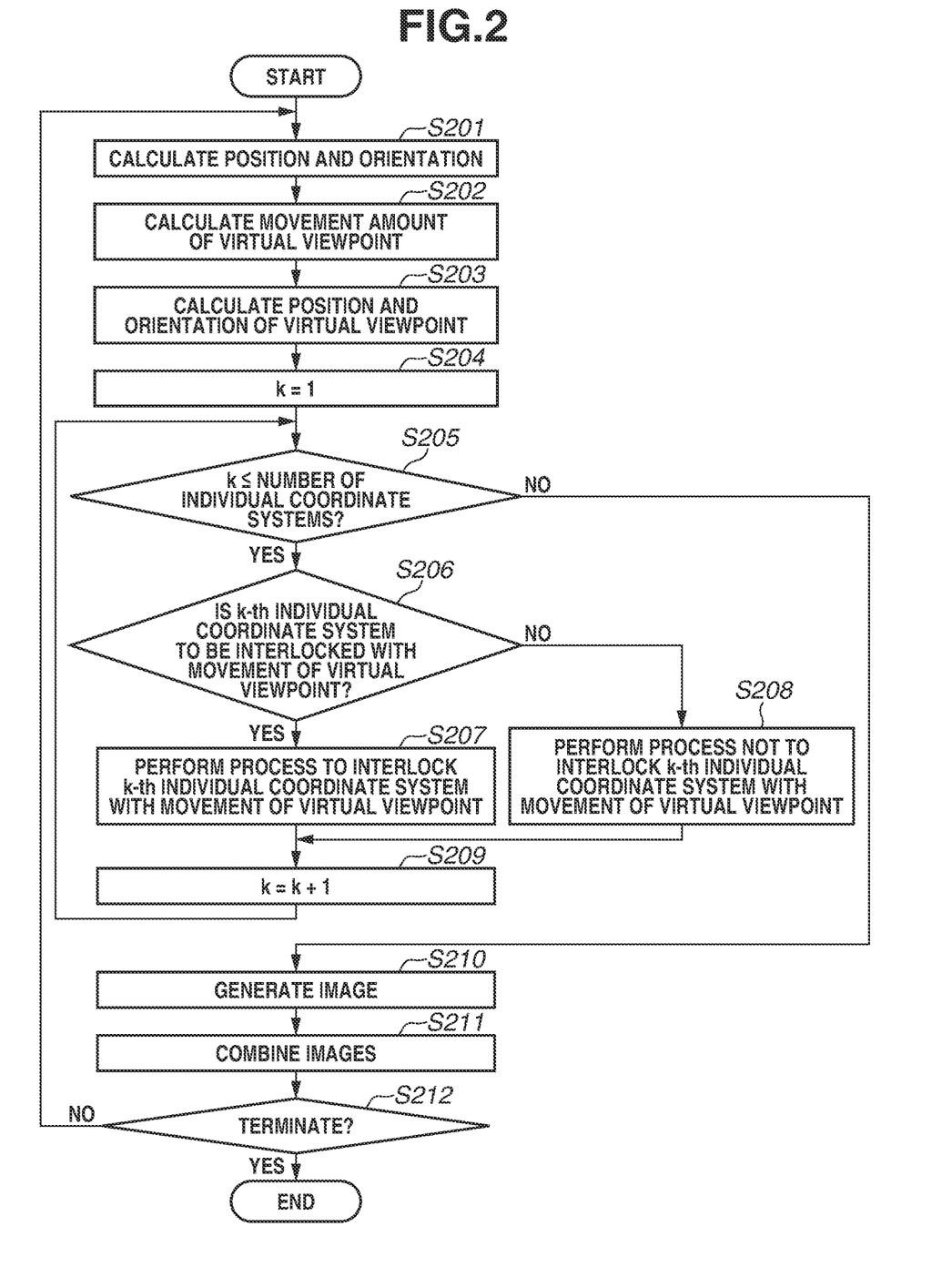
FIG. 2 is a flowchart illustrating information processing according to one or more aspects of the present disclosure.

FIG. 2 is a flowchart illustrating information processing performed by the information processing apparatus 110 to generate an MR image and output the generated MR image to the display apparatus 100. The processing will be described on the premises that there is a plurality of real objects that can be operated in a real space and that an individual coordinate system is set for each of the plurality of real objects. The position and orientation of a virtual object is associated with the position and orientation of the real object for which the individual coordinate system is set.

In step S201, the position orientation calculation unit 111 calculates a position and orientation of the image capturing unit 101 and a position and orientation of the real object in the individual coordinate system.

In step S202, the viewpoint movement processing unit 112 calculates a movement amount of a virtual viewpoint based on an input value from the input unit 121.

In step S203, the viewpoint movement processing unit 112 calculates a position and orientation of the virtual viewpoint by adding the movement amount of the virtual viewpoint calculated in step S202 to the position and orientation of the image capturing unit 101 calculated in step S201.

In step S204, the control unit 113 sets k=1 as an initial setting of a value k designating the individual coordinate system of the k-th real object. In step S205, the control unit 113 compares the value k and the total number of the set individual coordinate systems. In a case where the value k is less than or equal to the total number of the individual coordinate systems (YES in step S205), the processing proceeds to step S206. In a case where the value k exceeds the total number of the individual coordinate systems (NO in step S205), the processing proceeds to step S210.

In step S206, the control unit 113 determines whether the real object for which the k-th individual coordinate system is set satisfies a predetermined condition. In a case where the control unit 113 determines that the predetermined condition is satisfied (YES in step S206), the processing proceeds to step S207. In a case where the control unit 113 determines that the predetermined condition is not satisfied (NO in step S206), the processing proceeds to step S208.

In step S207, the control unit 113 controls the position and orientation of the virtual object associated with the real object for which the k-th individual coordinate system is set and which is calculated in step S201, to move in a manner interlocking with movement of the virtual viewpoint. Specifically, the control unit 113 acquires the position and orientation of the virtual object by updating the position and orientation of the real object in the k-th individual coordinate system, using the movement amount of the virtual viewpoint calculated in step S202. The relationship between the position and orientation of the virtual viewpoint and the position and orientation of the virtual object associated with the real object is thereby maintained.

In step S208, the control unit 113 controls the position and orientation of the virtual object associated with the real object for which the k-th individual coordinate system is set and which is calculated in step S201, to move not in a manner interlocking with movement of the virtual viewpoint. Specifically, the control unit 113 acquires the position and orientation of the real object in the k-th individual coordinate system, directly as the position and orientation of the virtual object. The relationship between the position and orientation of the image capturing unit 101 and the position and orientation of the virtual object associated with the real object is thereby maintained.

After step S207 and step S208, the processing proceeds to step S209. In step S209, the control unit 113 increases the value k by 1. Afterward, the processing returns to step S205.

In step S210, the image generation unit 114 generates a virtual image, using the position and orientation of the virtual viewpoint calculated in step S203 and the position and orientation of the virtual object calculated in step S207 and step S208.

In step S211, the image combining unit 115 combines an image of a real space captured by the image capturing unit 101 and the virtual image generated in step S210, thereby generating an MR image. The generated MR image is output to the display apparatus 100.

In step S212, the information processing apparatus 110 determines whether a termination instruction to terminate this flowchart is input. In a case where the information processing apparatus 110 determines that the termination instruction is input (YES in step S212), the processing of the flowchart ends. The processing returns to step S201, as long as the termination instruction is not input (NO in step S212). In this step, it may be determined whether a condition for terminating this flowchart is satisfied.

While various conditions are conceivable as the predetermined condition to be used to determine whether to interlock the virtual object having the individual coordinate system with the movement processing for the virtual viewpoint, one example will be described below.

Figure 3A:
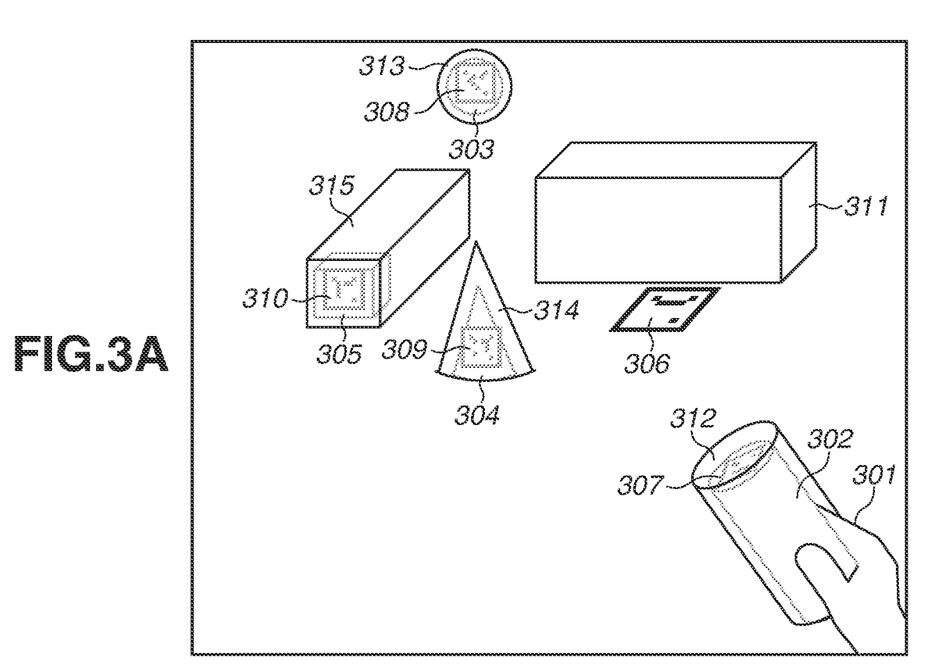
FIG. 3A is a diagram illustrating a mixed reality (MR) image (a state where there is no movement amount of a virtual viewpoint) in information processing according to one or more aspects of the present disclosure.
Figure 3B:
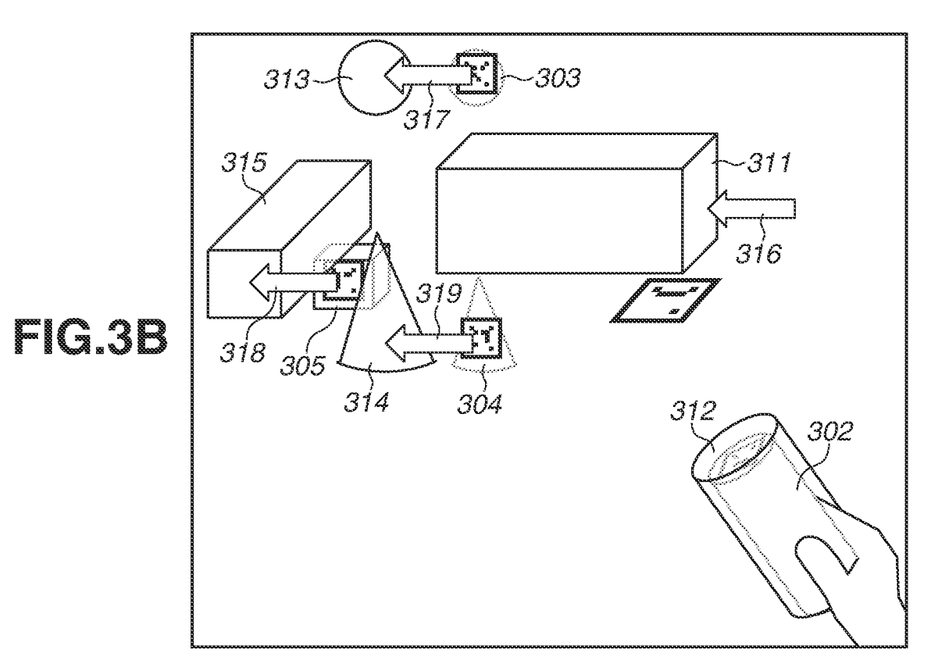
FIG. 3B is a diagram illustrating an MR image (a state where a virtual viewpoint has been moved) in information processing according to one or more aspects of the present disclosure.

FIG. 3A and FIG. 3B each illustrate an MR image generated by the image combining unit 115 as a result of combining images. The control of interlocking/non-interlocking with the movement processing for the virtual viewpoint with respect to the virtual object having the individual coordinate system will be described with reference to FIG. 3A and FIG. 3B.

Real objects 302, 303, 304, and 305 are objects that are present in a real space and can be operated by a user. In an example in each of FIG. 3A and FIG. 3B, the real object 302 is held by a hand 301 of the user. A marker 306 is a marker assigned to a world coordinate system. Markers 307, 308, 309, and 310 are markers each assigned to an individual coordinate system. A virtual object 311 is an object present in a virtual space assigned to the world coordinate system. Virtual objects 312, 313, 314, and 315 are virtual objects associated with the real objects 302, 303, 304, and 305 to which the markers 307, 308, 309, and 310 are given. In other words, the individual coordinate system is set for each of the virtual objects 312, 313, 314, and 315. An arrow 316 in FIG. 3B schematically indicates a movement amount of a virtual viewpoint. FIG. 3B illustrates a state where the display position of the virtual object 311 has been moved as a result of movement of the virtual viewpoint in a direction indicated by the arrow 316. Arrows 317, 318, and 319 indicate that the positions and orientations of the virtual objects 313, 314, and 315 have moved in a manner interlocking with the movement amount of the virtual viewpoint. The arrows 316, 317, 318, and 319 are additionally illustrated for the purpose of describing the present exemplary embodiment, and are not actually displayed on a virtual image. The number of the real objects to each of which the marker assigned to the individual coordinate system is given is not particularly limited to a specific number as long as the number is one or more.

FIG. 3A illustrates a state where there is no input from the input unit 121 and there is no movement amount of the virtual viewpoint.

In a case where there is no movement amount of the virtual viewpoint, a virtual image is generated using the position and orientation of the image capturing unit 101 calculated by the position orientation calculation unit 111, as the position and orientation of the virtual viewpoint, and using the positions and orientations of the real objects 302 to 305 calculated by the position orientation calculation unit 111, as the positions and orientations of the virtual objects 312 to 315. An MR image obtained by combining the virtual image and the image of the real space of the image capturing unit 101 is generated.

FIG. 3B illustrates a state where the virtual viewpoint has been moved by an input from the input unit 121. In a case where the virtual viewpoint has been moved, the virtual object 311 on the world coordinate system moves in the direction indicated by the arrow 316. In the present exemplary embodiment, as the predetermined condition for determining whether to interlock the position and orientation of the virtual object having the individual coordinate system with the movement of the virtual viewpoint, the relative distance between the image capturing unit 101 and each of the real objects 302 to 305 is used. The control unit 113 interlocks the position and orientation of the virtual object on the individual coordinate system with the movement amount of the virtual viewpoint in a case where the relative distance is more than or equal to a threshold. The control unit 113 does not interlock the position and orientation of the virtual object on the individual coordinate system with the movement amount of the virtual viewpoint in a case where the relative distance is less than the threshold.

In the above description, the relative distance between the image capturing unit 101 and each of the real objects 302 to 305 is used as the predetermined condition, but the relative distance between the image capturing unit 101 and each of the virtual objects 312 to 315 immediately before the virtual viewpoint has been moved may be used. The predetermined condition is not limited to the relative distance, and the relative angle may be used, or both the distance and the angle may be used.

In the example in FIG. 3B, the positions and orientations of the virtual objects 313 to 315 associated with the real objects 303 to 305 from which the relative distance to the image capturing unit 101 is more than or equal to the threshold are interlocked with the movement amount of the virtual viewpoint. In a case where the relative distance is determined to be more than or equal to the threshold, the information processing apparatus 110 controls the display positions of the virtual objects 313 to 315 associated with the real objects 303 to 305 in the directions of the arrows 317 to 319, respectively.

In the example in FIG. 3B, the position and orientation of the virtual object 312 associated with the real object 302 from which the relative distance to the image capturing unit 101 is less than the threshold are not interlocked with the movement of the virtual viewpoint. In a case where the relative distance is determined to be less than the threshold, the information processing apparatus 110 controls the display position of the virtual object 312 associated with the real object 302 not to be interlocked with the movement of the virtual viewpoint. In other words, the virtual object 312 is displayed at the same position as the position in a state where there is no movement of the virtual viewpoint.

As described above, the information processing apparatus 110 controls interlocking/non-interlocking with the movement processing for the virtual viewpoint, with respect to the virtual object having the individual coordinate system. Accordingly, in a case where the virtual viewpoint is moved, it is possible to view, together with the virtual object on the world coordinate system, the virtual object to be interlocked with the movement amount of the virtual viewpoint, from a different viewpoint reflecting the movement amount of the virtual viewpoint. On the other hand, the virtual object not to be interlocked with the movement amount of the virtual viewpoint is displayed at the same position as the position in a state where there is no movement amount of the virtual viewpoint. The user holding and operating the real object associated with the virtual object can also thereby continue the operation in the same manner as before the movement of the virtual viewpoint, at the different viewpoint reflecting the movement amount of the virtual viewpoint. In this way, when the virtual viewpoint is moved, a virtual image is generated by appropriately combining interlocking and non-interlocking with the movement amount of the virtual viewpoint, for each of the virtual objects each having the individual coordinate system, and the generated virtual image can be presented to the user.

According to the information processing apparatus 110 of the present exemplary embodiment described above, it is possible to realize motion control of a virtual object desirable for a user, when a virtual viewpoint is moved in a space including the virtual object.

In the above-described exemplary embodiment, the relative distance between the image capturing unit 101 and the real object associated with the virtual object is used as the predetermined condition used to determine whether to interlock the position and orientation of the virtual object having the individual coordinate system with the movement of the virtual viewpoint, but the predetermined condition is not limited to the case in which the relative distance is used. Information about the position and orientation of the virtual object having the individual coordinate system or information about the movement may be used. Specifically, the information processing apparatus 110 chronologically analyzes the position of each of a marker assigned to the world coordinate system and a marker assigned to the individual coordinate system in an image in a real space, and thereby acquires the relative moving speed or the relative movement trajectory between a virtual viewpoint and a virtual object. The acquired relative moving speed or relative movement trajectory may be used as the predetermined condition. The moving speed or movement trajectory of the virtual object may be used as the predetermined condition.

A contact state of a user, including holding and attachment of a real object, may be used as the predetermined condition. Specifically, the information processing apparatus 110 detects a state where a user holds a real object or a state where a real object is attached to the user, and in a case where the real object is held or attached, the information processing apparatus 110 controls a virtual object associated with the held or attached real object not to be interlocked with movement of a virtual viewpoint. On the other hand, in a case where the real object is not held or attached, the information processing apparatus 110 controls a virtual object associated with the real object not held or attached, to be interlocked with the movement of the virtual viewpoint. The state where the user holds the real object or the state where the real object is attached to the user may be detected using a pressure sensor or touch sensor attached to the real object. A detection sensor for detecting the position and orientation of a hand of a user and the position and orientation of a real object may be provided, and the information processing apparatus 110 may acquire a state where the hand of the user is in contact with the real object, based on a result of chronological detection by the detection sensor. The information processing apparatus 110 may detect the state where the hand of the user is in contact with the real object by analyzing an image captured by the image capturing unit 101, instead of using the detection sensor. The part of the user that comes into contact with the real object is not limited to the hand, and may be a predetermined part of the user that can be in contact with the real object.

In the above-described exemplary embodiment, the individual coordinate system is set for the virtual object, but the individual coordinate system may not be set. In this case, the information processing apparatus 110 may control interlocking/non-interlocking with the movement processing for the virtual viewpoint, with respect to information representing the position and orientation of the virtual object on the world coordinate system.

In the above-described exemplary embodiment, the user is one person, but a plurality of users may be involved. In this case, the position and orientation of a virtual object on the world coordinate system, the position and orientation of a virtual viewpoint, and the position and orientation of a real object are shared by the plurality of users, and the interlocking/non-interlocking is controlled for each user when the virtual viewpoint is moved for each user. In addition to the position and orientation of the virtual object on the world coordinate system, the position and orientation of the virtual viewpoint, and the position and orientation of the real object, a movement amount of the virtual viewpoint, and a result of controlling the interlocking/non-interlocking with the movement processing for the virtual viewpoint with respect to a virtual object having the individual coordinate system may also be shared by the plurality of users.

A second exemplary embodiment will be described. In the present exemplary embodiment, there will be described a method of changing a display manner of a virtual object from a state before a virtual viewpoint are moved to a state after the virtual viewpoint are moved, in a case where non-interlocking with movement processing for the virtual viewpoint is determined. For example, an information processing apparatus 110 performs control so that, in a case where the position and orientation of the virtual object is not to be interlocked, another virtual object is generated as a copy and the copy is displayed at the display position of the virtual object.

Figure 4A:
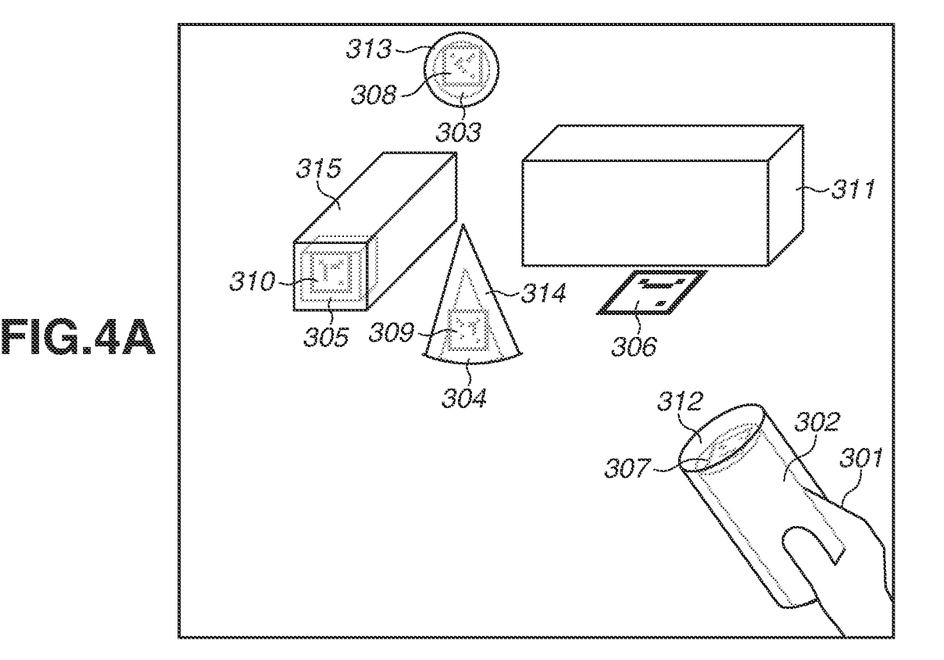
FIG. 4A is a diagram illustrating an MR image (a state where there is no movement amount of a virtual viewpoint) in information processing according to one or more aspects of the present disclosure.
Figure 4B:
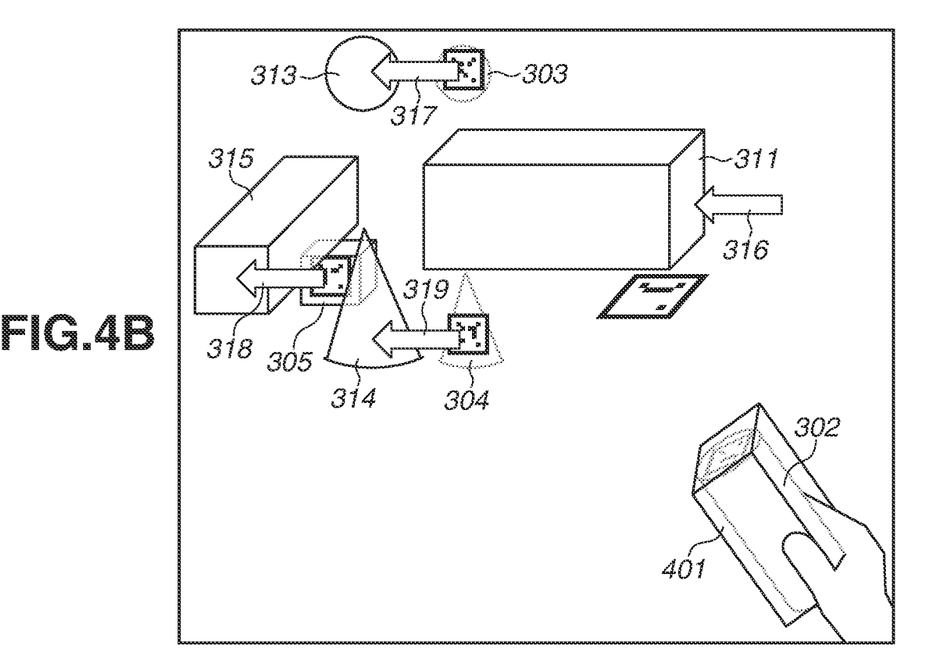
FIG. 4B is a diagram illustrating an MR image (a state where a virtual viewpoint has been moved) in information processing according to one or more aspects of the present disclosure.

FIG. 4A and FIG. 4B each illustrate an MR image generated by an image combining unit 115 as a result of combining images. Elements similar to those in FIG. 3A and FIG. 3B are denoted by the same numbers as those in FIG. 3A and FIG. 3B, and the description thereof will be omitted.

FIG. 4A illustrates a state similar to the state in FIG. 3A.

FIG. 4B illustrates a state where a virtual viewpoint has been moved by an input value from an input unit 121, as with FIG. 3B. In the present exemplary embodiment, the information processing apparatus 110 generates a copy of a predetermined virtual object or a virtual object designated by a user, in correspondence with the position and orientation of a virtual object determined not to be interlocked with movement of the virtual viewpoint, and displays the copy. In the present exemplary embodiment, as a predetermined condition for determining whether to interlock a virtual object on an individual coordinate system with movement of a virtual viewpoint, the relative distance between the image capturing unit 101 and a real object associated with the virtual object is used, as in the first exemplary embodiment. The information processing apparatus 110 interlocks the position and orientation of the virtual object on the individual coordinate system with movement of the virtual viewpoint in a case where the relative distance is more than or equal to a threshold, and the information processing apparatus 110 does not interlock the position and orientation of the virtual object on the individual coordinate system with the movement of the virtual viewpoint in a case where the relative distance is less than the threshold.

In the example in FIG. 4B, as in the case of FIG. 3B, a virtual object 312 associated with a real object 302 from which the relative distance to the image capturing unit 101 is less than the threshold is determined not to be interlocked with the movement of the virtual viewpoint. In a case where the relative distance is determined to be less than the threshold, the information processing apparatus 110 controls the position and orientation of the virtual object 312 on the real object 302 not to be interlocked with the movement of the virtual viewpoint. In the present exemplary embodiment, further, a copy of a virtual object 315 that is one of the virtual objects on the individual coordinate systems interlocking with the movement of the virtual viewpoint is generated, and the generated copy of the virtual object 315 is displayed in place of the virtual object 312. In other words, the virtual object 312 on the real object 302 is changed to a virtual object 401, and the virtual object 401 is displayed at the same position as the position in a state where there is no movement of the virtual viewpoint. Accordingly, when the virtual viewpoint moves and observation from a different virtual viewpoint is performed, a copy of another virtual object is generated and the copy is newly associated with the real object held by the user. It is therefore possible for the user to use the real object for a new purpose while holding the same real object.

With the information processing apparatus 110 of the present exemplary embodiment described above, it is possible to realize motion control of a virtual object desirable for a user, when moving a virtual viewpoint in a space including the virtual object, as with the first exemplary embodiment.

In the above-described exemplary embodiment, a copy of the virtual object on the individual coordinate system interlocking with the movement of the virtual viewpoint is generated, but a copy of a virtual object on the world coordinate system may be generated, or a copy of a virtual object on the individual coordinate system not interlocking with the movement of the virtual viewpoint may be generated.

[Hardware Configuration Example]

Figure 5:
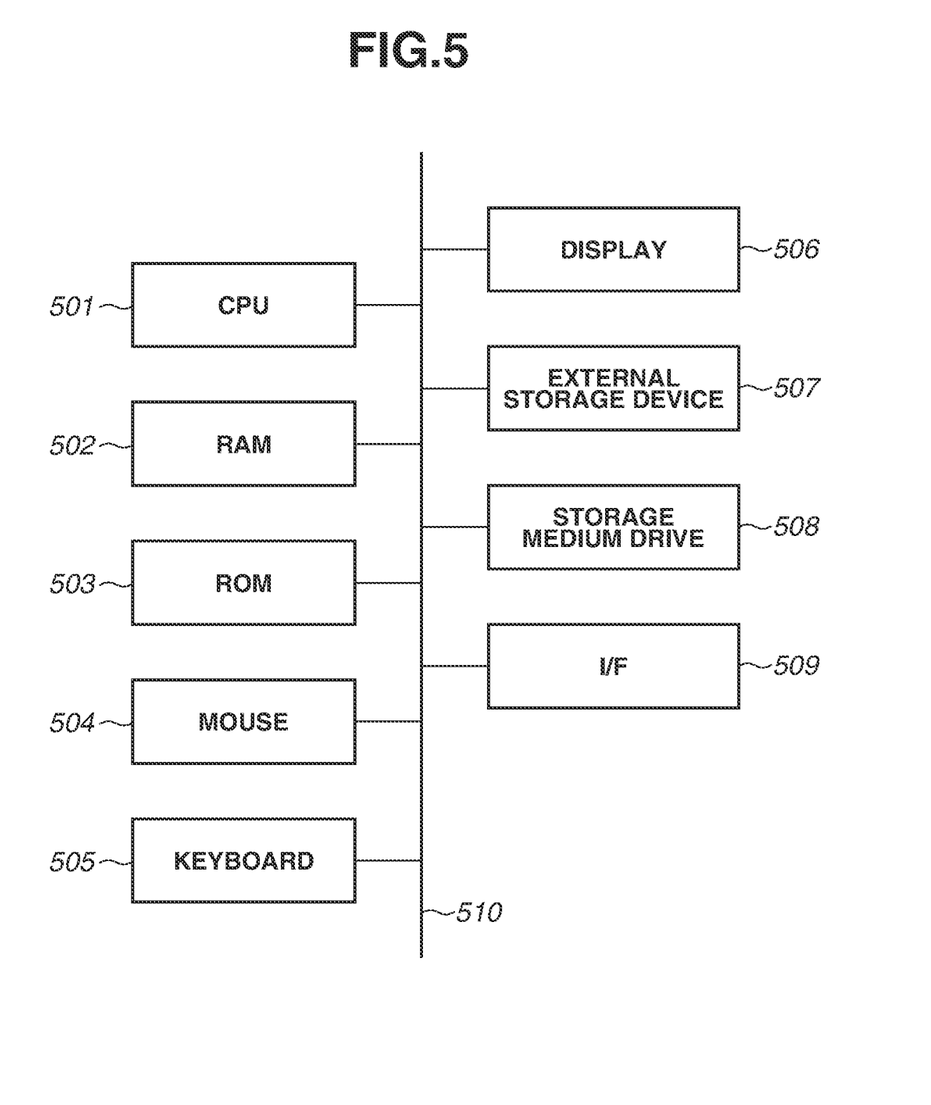
FIG. 5 is a diagram illustrating an example of a hardware configuration in which an information processing apparatus can be implemented.

FIG. 5 is a diagram illustrating a hardware configuration of a computer on which the information processing apparatus 110 in each of the above-described exemplary embodiments can be implemented. Each unit of the information processing apparatus 110 in each of the above-described exemplary embodiments may be formed of hardware, or may be realized by a program executed by a central processing unit (CPU) 501.

In FIG. 5, the computer as the information processing apparatus 110 includes the CPU 501, a RAM 502, a read only memory (ROM) 503, a mouse 504, a keyboard 505, a display 506, an external storage device 507, a storage medium drive 508, and an interface (I/F) 509. These devices are interconnected via a bus 510.

The CPU 501 comprehensively controls the information processing apparatus 110. The RAM 502 temporarily stores data loaded from the external storage device 507 and the storage medium drive 508 and data necessary for information processing. The RAM 502 also functions as the data storage unit 116 illustrated in FIG. 1. The RAM 502 temporarily stores data received from outside, e.g., from the display apparatus 100 and the input apparatus 120, via the I/F 509. The data received from outside includes an image of a real space captured by the image capturing unit 101 and an input value generated by the input apparatus 120. The RAM 502 also functions as a work area of the CPU 501. The ROM 503 stores setup data, a boot program, and the like of the computer. The mouse 504 and the keyboard 505 are examples of an operation input apparatus and are operated by a user of the computer to input various instructions for the CPU 501. The display 506 includes a cathode ray tube (CRT) screen, a liquid crystal display (LCD) screen, or the like, and displays a result of processing by the CPU 501 in form of image, character, and the like. For example, the display 506 can display a message and the like to be displayed for measurement of the position and orientation of the display apparatus 100.

The external storage device 507 is a large-capacity information storage device represented by a hard disk drive. The external storage device 507 stores an operating system (OS), a program executable by the information processing apparatus 110, and various data. The program and various data stored in the external storage device 507 are appropriately loaded into the RAM 502 under control by the CPU 501. The CPU 501 loads the program stored in the external storage device 507 into the RAM 502 and executes the loaded program, so that the computer functions as the position orientation calculation unit 111, the viewpoint movement processing unit 112, the control unit 113, the image generation unit 114, and the image combining unit 115. The CPU 501 loads the program stored in the external storage device 507 into the RAM 502 and executes the loaded program, so that the processing indicated by the flowchart in FIG. 2 is realized. Data for building a virtual space and data described as known information in each of the exemplary embodiments are included in the various data stored in the external storage device 507. The external storage device 507 may function as the data storage unit 116 illustrated in FIG. 1.

The storage medium drive 508 loads a program and data recorded in a storage medium such as a compact disc ROM (CD-ROM) or a digital versatile disc ROM (DVD-ROM), and writes a program and data into the storage medium. Part or all of the program and data described to be stored in the external storage device 507 may be recorded in the storage medium. The program and data loaded from the storage medium by the storage medium drive 508 are output to the external storage device 507 or the RAM 502. The I/F 509 includes an analog video port for connecting the image capturing unit 101 of the display apparatus 100, a digital input/output port based on a standard such as the Institute of Electrical and Electronics Engineers (IEEE) 1394, an Ethernet® port for outputting a combined image to the display unit 102 of the display apparatus 100, and the like. The data received via the I/F 509 is input to the RAM 502 or the external storage device 507. In a case where a sensor system is used to acquire information representing the position and orientation of a virtual viewpoint and the position and orientation of a real object, the sensor system is connected to the I/F 509.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-016424, filed Feb. 4, 2022, which is hereby incorporated by reference herein in its entirety.

What is claimed is:

1. An information processing apparatus comprising:
at least one processor which functions as:
an acquisition unit configured to acquire a position and orientation of a virtual viewpoint and a position and orientation of each of one or more virtual objects;
a movement unit configured to move the virtual viewpoint;
a control unit configured to control each of the one or more virtual objects to be interlocked or not to be interlocked with movement of the virtual viewpoint based on whether the virtual object satisfies a predetermined condition; and
a generation unit configured to generate a virtual image including the controlled one or more virtual objects at a viewpoint as a result of moving the virtual viewpoint,
wherein information about movement of the virtual object is used as the predetermined condition.

2. The information processing apparatus according to claim 1, wherein the control unit controls whether to move the position and orientation of the virtual object acquired by the acquisition unit in a manner interlocking with the movement of the virtual viewpoint.

3. The information processing apparatus according to claim 1,
wherein, with respect to the virtual object satisfying the predetermined condition, the control unit moves the position and orientation of the virtual object acquired by the acquisition unit, in a manner interlocking with the movement of the virtual viewpoint, and
wherein, with respect to the virtual object not satisfying the predetermined condition, the control unit maintains the position and orientation of the virtual object acquired by the acquisition unit, without interlocking the virtual object with the movement of the virtual viewpoint.

4. The information processing apparatus according to claim 1, wherein the control unit changes the virtual object not to be interlocked with the movement of the virtual viewpoint to a different one of the virtual objects.

5. The information processing apparatus according to claim 4,
wherein the at least one processor functions as a copying unit configured to generate a copy of the virtual object, and
wherein the control unit replaces the virtual object not to be interlocked with the movement of the virtual viewpoint with the generated copy as the different one of the virtual objects.

6. The information processing apparatus according to claim 1, wherein at least one of a relative distance between the virtual viewpoint and the virtual object and a relative angle between the virtual viewpoint and the virtual object is used as the predetermined condition.

7. The information processing apparatus according to claim 6,
wherein the relative distance between the virtual viewpoint and the virtual object is used as the predetermined condition,
wherein, with respect to the virtual object from which the relative distance to the virtual viewpoint is less than a threshold, the control unit maintains the position and orientation acquired by the acquisition unit, and
wherein, with respect to the virtual object from which the relative distance to the virtual viewpoint is more than or equal to the threshold, the control unit moves the position and orientation acquired by the acquisition unit in a manner interlocking with the movement of the virtual viewpoint.

8. The information processing apparatus according to claim 1, wherein at least one of the position and the orientation of the virtual object is used as the predetermined condition.

9. The information processing apparatus according to claim 1, wherein at least one of a relative moving speed between the virtual viewpoint and the virtual object and a relative movement trajectory between the virtual viewpoint and the virtual object is used as the predetermined condition.

10. The information processing apparatus according to claim 1, wherein at least one of the one or more virtual objects is associated with a real object.

11. The information processing apparatus according to claim 1, wherein the acquisition unit acquires a position and orientation of an image capturing apparatus configured to capture an image of a real space as the position and orientation of the virtual viewpoint.

12. The information processing apparatus according to claim 11, wherein the acquisition unit acquires the position and orientation of each of the one or more virtual objects based on the image of the real space captured by the image capturing apparatus.

13. The information processing apparatus according to claim 1, wherein the movement unit calculates a movement amount of the virtual viewpoint based on a value input from an input apparatus configured to input an instruction for a direction and/or a position from a user observing the virtual image.

14. An information processing apparatus comprising:
at least one processor which functions as:
an acquisition unit configured to acquire a position and orientation of a virtual viewpoint and a position and orientation of each of one or more virtual objects;
a movement unit configured to move the virtual viewpoint;
a control unit configured to control each of the one or more virtual objects to be interlocked or not to be interlocked with movement of the virtual viewpoint based on whether the virtual object satisfies a predetermined condition; and a generation unit configured to generate a virtual image including the controlled one or more virtual objects at a viewpoint as a result of moving the virtual viewpoint, wherein the at least one processor functions as a detection unit configured to detect a contact state where a predetermined part of a user observing the virtual image is in contact with the real object, and wherein the contact state where the predetermined part is in contact with the real object is used as the predetermined condition.

15. The information processing apparatus according to claim 14, wherein the predetermined part is a hand.

16. The information processing apparatus according to claim 14, wherein the control unit maintains the position and orientation acquired by the acquisition unit as the position and orientation of the virtual object associated with the real object in a case where the predetermined part of the user is in contact with the real object, and wherein the control unit moves the position and orientation of the virtual object associated with the real object in a manner interlocking with the movement of the virtual viewpoint in a case where the predetermined part of the user is not in contact with the real object.

17. An information processing method comprising:

acquiring a position and orientation of a virtual viewpoint and a position and orientation of each of one or more virtual objects;

moving the virtual viewpoint;

controlling each of the one or more virtual objects to be interlocked or not to be interlocked with movement of the virtual viewpoint based on whether the virtual object satisfies a predetermined condition; and generating a virtual image including the controlled one or more virtual objects at a viewpoint as a result of moving the virtual viewpoint, wherein information about movement of the virtual object is used as the predetermined condition.

18. A non-transitory computer-readable storage medium storing a program that causes a computer to execute an information processing method, the information processing method comprising:

acquiring a position and orientation of a virtual viewpoint and a position and orientation of each of one or more virtual objects;

moving the virtual viewpoint;

controlling each of the one or more virtual objects to be interlocked or not to be interlocked with movement of the virtual viewpoint based on whether the virtual object satisfies a predetermined condition; and generating a virtual image including the controlled one or more virtual objects at a viewpoint as a result of moving the virtual viewpoint, wherein information about movement of the virtual object is used as the predetermined condition.

* * * * *